United States Patent [19]

Tanaka

[11] Patent Number: 5,273,367
[45] Date of Patent: Dec. 28, 1993

[54] LINEAR MOTION ROLLING GUIDE UNIT AND A VIBRATION ISOLATION APPARATUS USED IN THE UNIT

[75] Inventor: Kazuhiko Tanaka, Tokyo, Japan

[73] Assignee: Nippon Thompson Co., Ltd., Tokyo, Japan

[21] Appl. No.: 977,855

[22] Filed: Nov. 17, 1992

[30] Foreign Application Priority Data

Nov. 25, 1991 [JP] Japan .................. 3-334526

[51] Int. Cl.⁵ .................. F16C 29/06; F16C 21/00
[52] U.S. Cl. .................. 384/45; 384/25; 384/54
[58] Field of Search .................. 384/43-45, 384/49, 50, 54, 42, 37, 25, 10, 8

[56] References Cited

U.S. PATENT DOCUMENTS

| | | | |
|---|---|---|---|
| 3,198,588 | 8/1965 | Cashman et al. | 384/54 |
| 4,376,556 | 3/1983 | Bergman et al. | 384/44 |
| 4,529,255 | 7/1985 | Piotrowski | 384/7 |
| 4,773,770 | 9/1988 | Osawa et al. | 384/45 |
| 4,953,988 | 9/1990 | Tsukada | 384/45 X |
| 4,968,155 | 11/1990 | Bode | 384/45 |
| 5,181,780 | 1/1993 | Morita | 384/8 |

FOREIGN PATENT DOCUMENTS 2279243 11/1990 Japan .

*Primary Examiner*—Thomas R. Hannon
*Attorney, Agent, or Firm*—Sughrue, Mion, Zinn, Macpeak & Seas

[57] ABSTRACT

A linear motion rolling guide unit and a damper apparatus used in this unit are described. Vibrations in both the direction of movement of the slider and vibrations in planes perpendicular to this direction of movement are effectively suppressed, and moreover, damping characteristics can be set as desired. This linear motion rolling guide unit includes a damping device with a plurality of damping apparatuses provided on a slider so as to be juxtaposed around a track rail, where the damping apparatuses include a liquid which is allowed to flow between sealed chambers to provide a damping effect.

9 Claims, 10 Drawing Sheets

LINEAR MOTION ROLLING GUIDE UNIT AND A VIBRATION ISOLATION APPARATUS USED IN THE UNIT

BACKGROUND OF THE INVENTION

1. Field of the Invention

The present invention relates to a linear motion rolling guide unit that linearly guides a movable element to be moved in a linear movement mechanism such as a machine tool or industrial robot, and a vibration isolation apparatus that gives vibration isolation properties to said unit.

2. Description of the Prior Art

An example of this type of linear motion rolling guide unit of the prior art is disclosed in, for example, Japanese Patent laid-open No. 2-279243, and its constitution is indicated in FIGS. 1 through 3.

As indicated in FIG. 1 and FIG. 2, this linear motion rolling guide unit has a track rail 3 fixed on a frame in the form of machine tool bed 1 by bolt 2 (shown in FIG. 2), and two sliders in the form of sliding units 5 of the first type guided by said track rail 3. A sliding unit of the second type in the form of vibration isolation unit 6 is equipped sandwiched in between each of these sliding units 5, which is also guided by track rail 3 as is clear from FIG. 3. Rectangular plate-shaped table 8 is mounted on these sliding units 5 and vibration isolation unit 6 by bolts 9 (shown in FIG. 2 and FIG. 3).

As indicated in FIG. 2, a total of four track surfaces 3a, for example two surfaces each on the right and left sides, are formed in parallel along the axial direction in track rail 3. Both sliding units 5 are straddled across track rail 3, and a portion of said sliding units 5 have four circulating paths 5a in opposition to these track surfaces 3a corresponding to each track surface. A plurality of rollers 10 are arranged and contained within each of these circulating paths 5a functioning as rolling elements that bear the load between track rail 3 and sliding unit 5 by circulating while rolling over track surfaces 3a accompanying movement of sliding units 5.

On the other hand, as is clear from FIG. 3, vibration isolation unit 6, provided as a damper, is also straddled across track rail 3, and a narrow cushioning gap 13 is provided between said vibration isolation unit and track rail 3. An oil film is formed in this cushioning gap 13 by oil being supplied through hole 6a provided in vibration isolation unit 6.

Two sets of the above-mentioned linear motion rolling guide unit (only 1 set of the linear motion rolling guide unit is shown in FIG. 1) are provided in parallel on the bed indicated in FIG. 1, and both support table 8. In this constitution, a workpiece (not shown) is placed and held in position on table 8. Table 8 then moves back and forth in the direction indicated by arrow F by a driving device not shown to allow the required processing for said workpiece, such as cutting work, to be performed.

In the linear motion rolling guide unit of the above-mentioned constitution, during the time cutting work on the workpiece is being performed, said linear motion rolling guide unit is subjected to mechanical vibrations. When measures have not been implemented to isolation such vibrations, the problem occurs in which the processed surface becomes heterogeneous due to the presence of such vibrations. Therefore, by charging oil into cushioning gap 13 formed between track rail 3 and vibration isolation unit 6 as described above in the prior art, vibrations between said track rail 3 and vibration isolation unit 6 are cushioned thus improving the finished accuracy of the processed surface.

However, although the prior art can be expected to demonstrate damping effects only when oil is uniformly filled into the cushioning gap as described above, since the surface tension of oil filled into cushioning gap 13 weakens due to the effects of vibrations or decreases in viscosity caused by heat and the passage of time, and the oil gradually runs down from track rail 3, in order for damping effects resulting from this oil film to continue to be maintained, oil must be supplied frequently, thus resulting in the disadvantage of bothersome maintenance. In addition, the prior art also has the problem of it not always being easy to form this cushioning gap to a uniform size over the entire range of the area at which it is to be provided.

SUMMARY OF THE INVENTION

In consideration of the above-mentioned disadvantages of the prior art, the object of the present invention is to provide a vibration isolation apparatus that eliminates the need to perform maintenance relating to vibration isolation function, achieves damping in all direction, and allows alteration of damping characteristics as desired, as well as a linear motion rolling guide unit equipped with said vibration isolation apparatus.

The linear motion rolling guide unit according to the present invention comprises: a vibration isolation device comprised of a plurality of vibration apparatuses provided on a slider so as to be juxtaposed around a track rail; and, the above-mentioned vibration isolation apparatuses comprising a liquid sealed chamber formed in the above-mentioned slider; vibration isolation liquid filled into the above-mentioned liquid sealed chamber; a piston rod provided so as to slide freely in the roughly perpendicular direction with respect to the axial direction in the above-mentioned liquid sealed chamber, and performing rising and lowering motion with respect to the above-mentioned liquid sealed chamber; a sliding contact member coupled to the end of the above-mentioned piston rod making sliding contact with a track surface; a force application device that applies force in the direction of rising and lowering of the above-mentioned piston rod; two types of connecting holes having a large diameter and small diameter formed in the above-mentioned piston rod so as to mutually connect one of the above-mentioned liquid sealed chambers with another liquid sealed chamber divided between the front and back of the above-mentioned piston rod by said piston rod; and, a regulating device that regulates the flow of the above-mentioned liquid to the above-mentioned front side from the above-mentioned back side via the above-mentioned large diameter connecting hole; in a linear motion rolling guide unit having the above-mentioned track rail wherein the above-mentioned track surfaces are formed along the axial direction, the above-mentioned sliders guided by the above-mentioned track rail, and the above-mentioned vibration isolation device performing vibration isolation action between the above-mentioned track rail and the above-mentioned slider.

In addition, the vibration isolation apparatus according to the present invention comprises: a liquid sealed chamber; vibration isolation liquid filled into the above-mentioned liquid sealed chamber; a piston rod provided in the above-mentioned liquid sealed chamber so as to slide freely in a prescribed direction, which performs rising and lowering motion with respect to the above-mentioned liquid sealed chamber; a sliding contact member coupled to the end of the above-mentioned piston rod making sliding contact with the prescribed track surface; a force application device that applies force in the direction of rising and lowering to the above-mentioned piston rod; two types of connecting holes having a large diameter and small diameter formed in the above-mentioned piston rod so as to mutually connect one of the above-mentioned liquid sealed chambers with the other chamber divided between the front and back sides of the above-mentioned piston rod by said piston rod; and, a regulating device that regulates the flow of the above-mentioned liquid to the above-mentioned front side from the above-mentioned back side via the above-mentioned large diameter connecting hole.

DESCRIPTION OF THE PREFERRED EMBODIMENTS

The following provides an explanation of embodiments of the linear motion rolling guide unit pertaining to the present invention.

Figure 4:
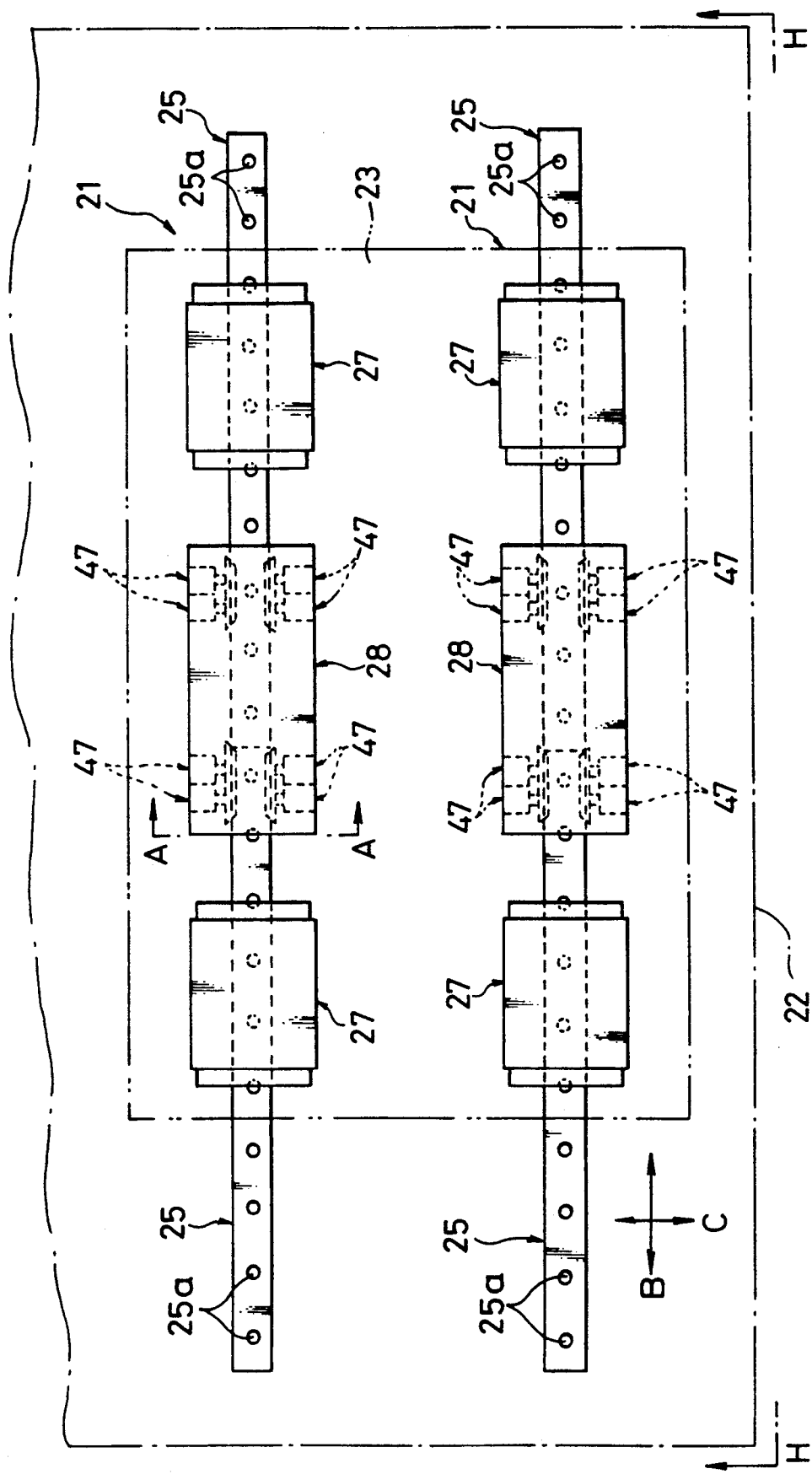
FIG. 4 is an overhead view indicating the linear motion rolling guide unit pertaining to the present invention mounted on the bed of a machine tool.
Figure 5:
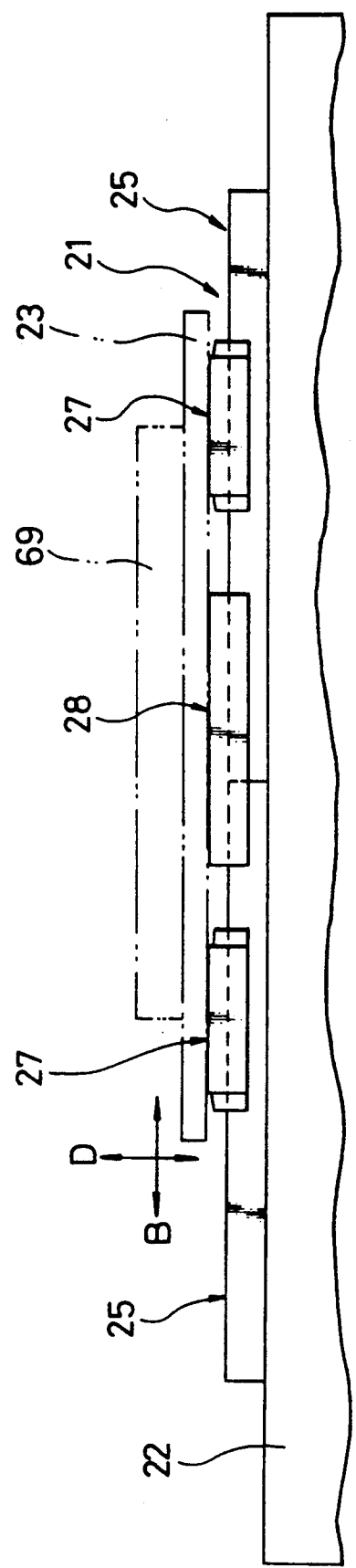
FIG. 5 is a perspective view in the direction of arrows H—H with respect to FIG. 4.

In FIG. 4 and FIG. 5, two sets of this linear motion rolling guide unit 21 are provided in parallel on bed 22 of a machine tool (the entire machine tool is not shown), supporting table 23 that moves in coordination with said sets of linear motion rolling guide units.

Figure 6:
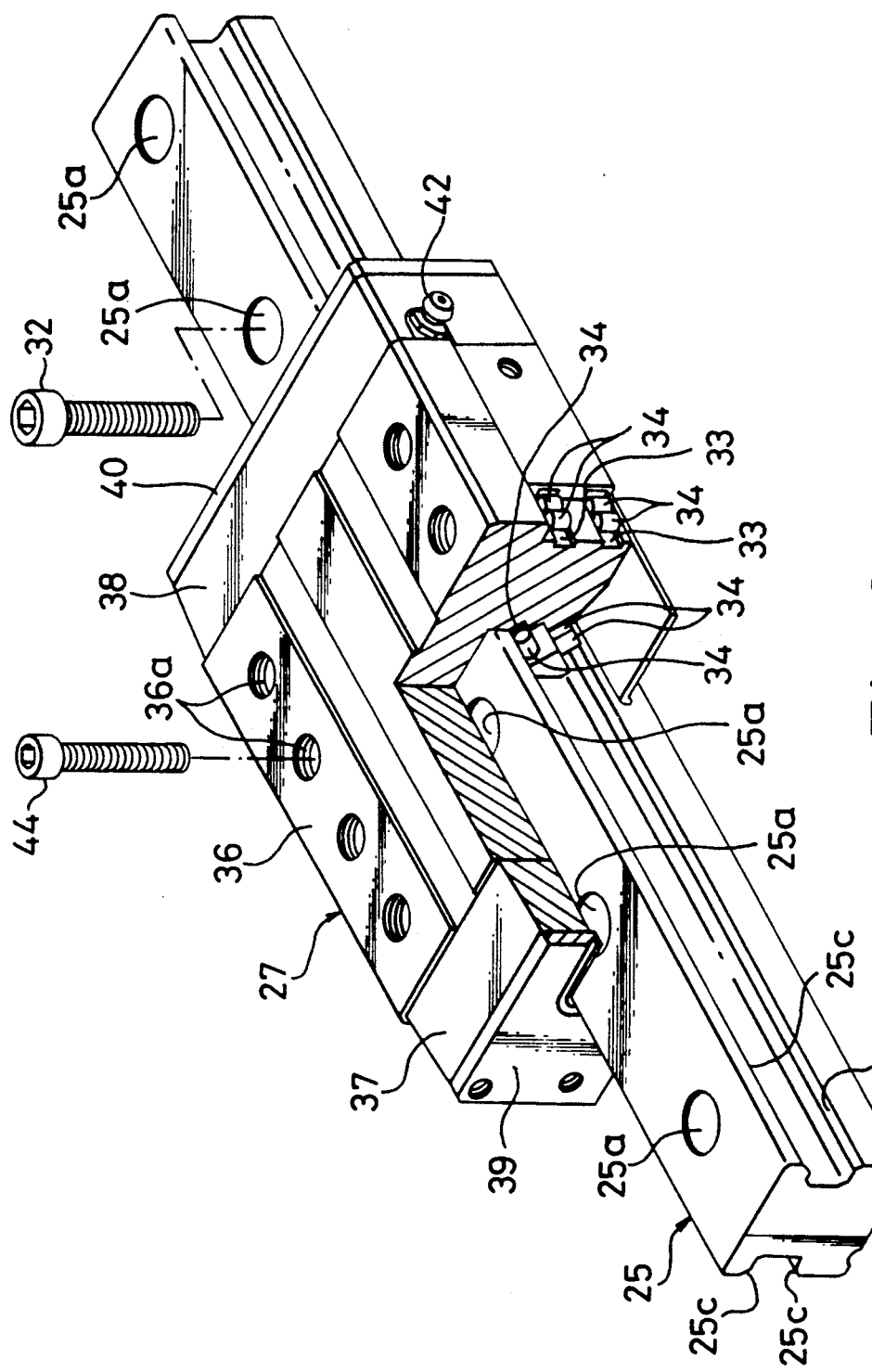
FIG. 6 is a perspective view containing a partial cross-sectional view of the track rail and sliding unit equipped on the linear motion rolling guide unit indicated in FIG. 4.

Both linear motion rolling guide units 21 have two linear track rails 25 fixed in rows on bed 22, sliders of the first type in the form of two sliding units 27 guided by said track rail 25, and a slider of the second type in the form of vibration isolation unit 28 arranged so as to be juxtaposed to the front and back between both sliding units 27, and guided by track rail 25. Furthermore, as indicated in FIG. 6, each track rail 25 is fastened to bed 22 by a plurality of bolts (with hexagon sockets) 32. More specifically, as is particularly clear from FIG. 7, counterbore 25a, having a diameter larger than the head of bolt 32 for fastening track rail 25 to bed 22, and through hole 25b having a diameter slightly larger than the threaded portion of bolt 12, are formed concentrically in track rail 25. Bolt 32 is inserted into said counterbore and through hole so that its entirety is embedded in bed 22.

Figure 7:
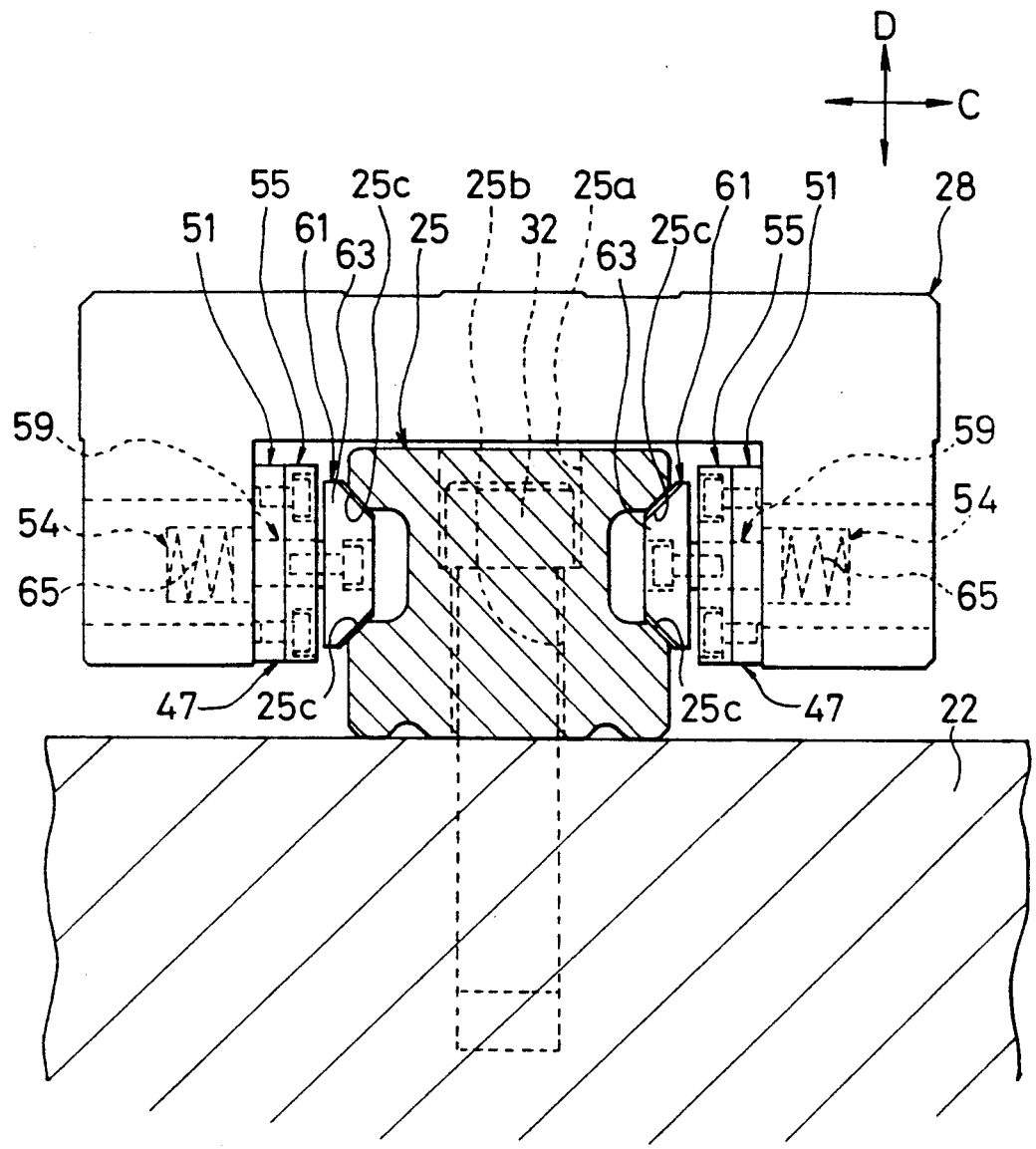
FIG. 7 is a perspective view in the direction of arrows A—A with respect to FIG. 4.

As indicated in FIG. 6 and FIG. 7, a total of four track surfaces 25c in the form of two surfaces each on the right and left sides are formed in parallel along the axial direction in track rail 25. Sliding unit 27 is straddled across this track rail 25, and a portion of that sliding unit 27 has four circulating paths 33 in opposition to each of said track surfaces 25c corresponding to each of said track surfaces. A plurality of rollers 34 are arranged and contained within these circulating paths 33 in the form of rolling elements that bear the load between track rail 25 and said sliding unit 27 by rolling over track surface 25c accompanying movement of sliding unit 27. As indicated in FIG. 6, sliding unit 27 has casing 36, a pair of end caps 37 and 38 coupled to both the front and back ends of said casing 36, and two end seals 39 and 40 mounted on the outside surfaces of each of said end caps. Although not indicated in the drawings, the above-mentioned circulating paths 33 are comprised of a load bearing path groove and return path each formed linearly and in parallel in this casing 36, and a pair of semicircular direction changing paths connected at both ends with said load bearing rail groove and return path formed in both end caps 37 and 38. Furthermore, a grease nipple 42 is mounted on end cap 38 for supplying grease to the above-mentioned rollers 34. In addition, as indicated in FIG. 6 a plurality of threaded holes 36a are formed in the upper surface of casing 36 of sliding unit 27. Table 23, indicated in FIG. 4 and FIG. 5, is fastened to said main unit by bolts (with hexagon sockets) 44 screwed into these threaded holes 36a.

On the other hand, FIG. 7 is a drawing indicating the cross-section taken along line A—A with respect to FIG. 4. As is clear from said drawing, vibration isolation unit 28, provided as a damper, is also straddled across track rail 25. As indicated in FIG. 4 and FIG. 7, a plurality of vibration isolation apparatuses 47 are provided in vibration isolation unit 28 so as to be juxtaposed around track rail 25 to the right and left. These vibration isolation apparatuses 47 serve to isolate vibration between track rail 25 and vibration isolation 28. In this case, although a total of 8 vibration isolation apparatuses 47 in the form of four each on the right and left sides of track rail 25 are provided for a single vibration isolation unit 28, the number of vibration apparatuses are not limited to such. The following provides a description of the constitution of each vibration isolation apparatus 47.

Figure 8:
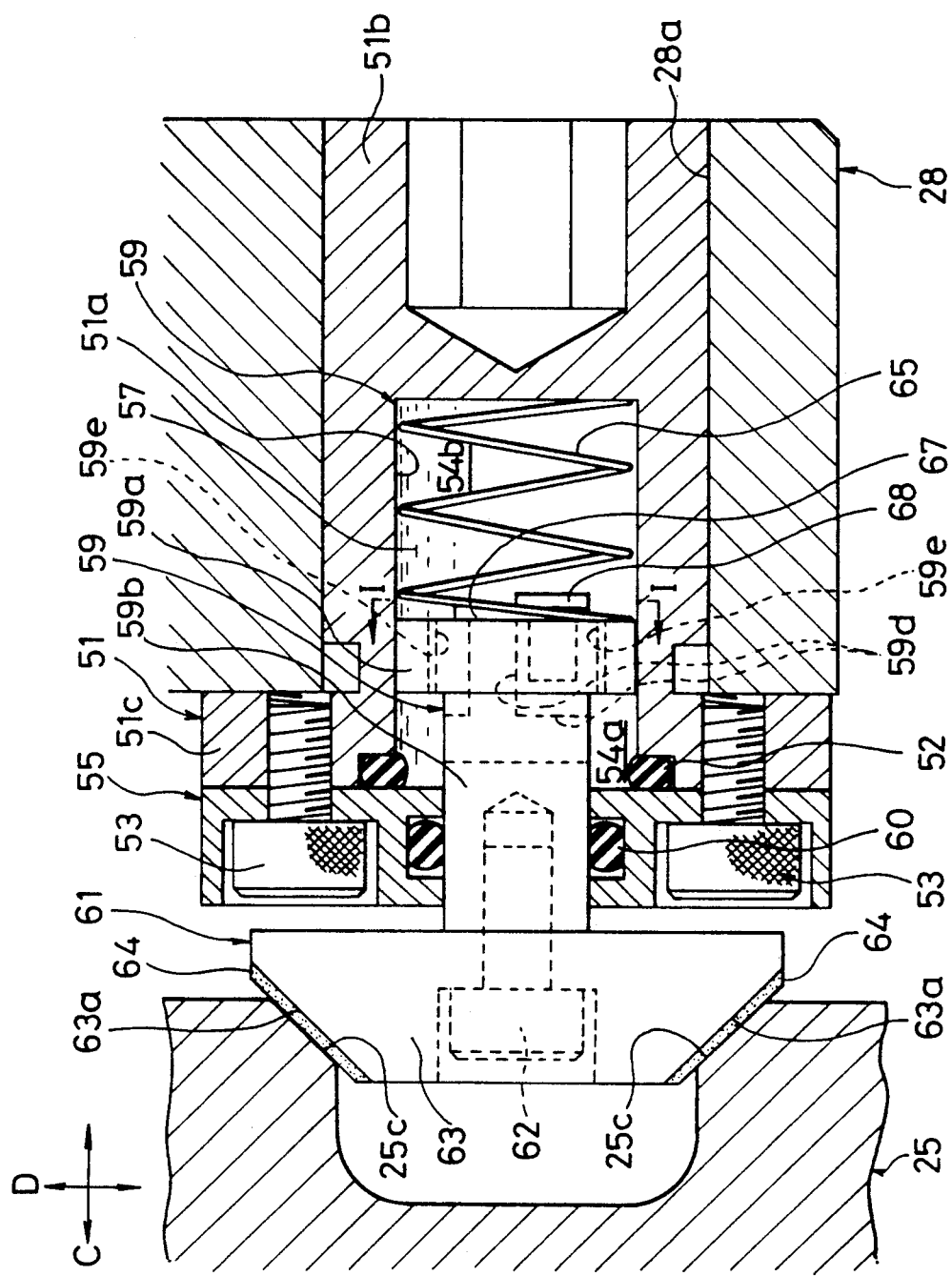
FIG. 8 is an enlarged view of the vibration isolation apparatus provided in the vibration isolation unit indicated in FIG. 7.

As indicated in FIG. 7 and FIG. 8, vibration isolation apparatus 27 has cylinder 51, the cross-section of which is such that circular concave portion 51a is formed in one end, and, for example, rectangular plate-form cover 55, that is fastened to said one end by bolts 53 (with hexagon socket) by means of O-ring 52, and forms liquid sealed chamber 54 with concave portion 51a. Vibration isolation liquid in the form of oil 57 is filled into this liquid sealed chamber 54. Furthermore, as is clear from FIG. 8, cylinder 51 has cylindrical portion 51b engaged with through hole 28a formed in the side of vibration isolation unit 28, and, for example, rectangular plateform flange portion 51c formed into an integrated structure on one end of said cylindrical portion 51b and in contact with cover 55. Piston rod 59 is provided in sealed liquid chamber 54 in a direction perpendicular to the axial direction of track rail 25, and in this case, able to slide freely to the left and right directions. Piston rod 59 is comprised of piston 59a and output rod 59b, and this output rod 59b rises and lowers with respect to sealed liquid chamber 54. Furthermore, O-ring 60, that acts to seal the liquid, is installed between output rod 59b and cover 55.

Figure 9:
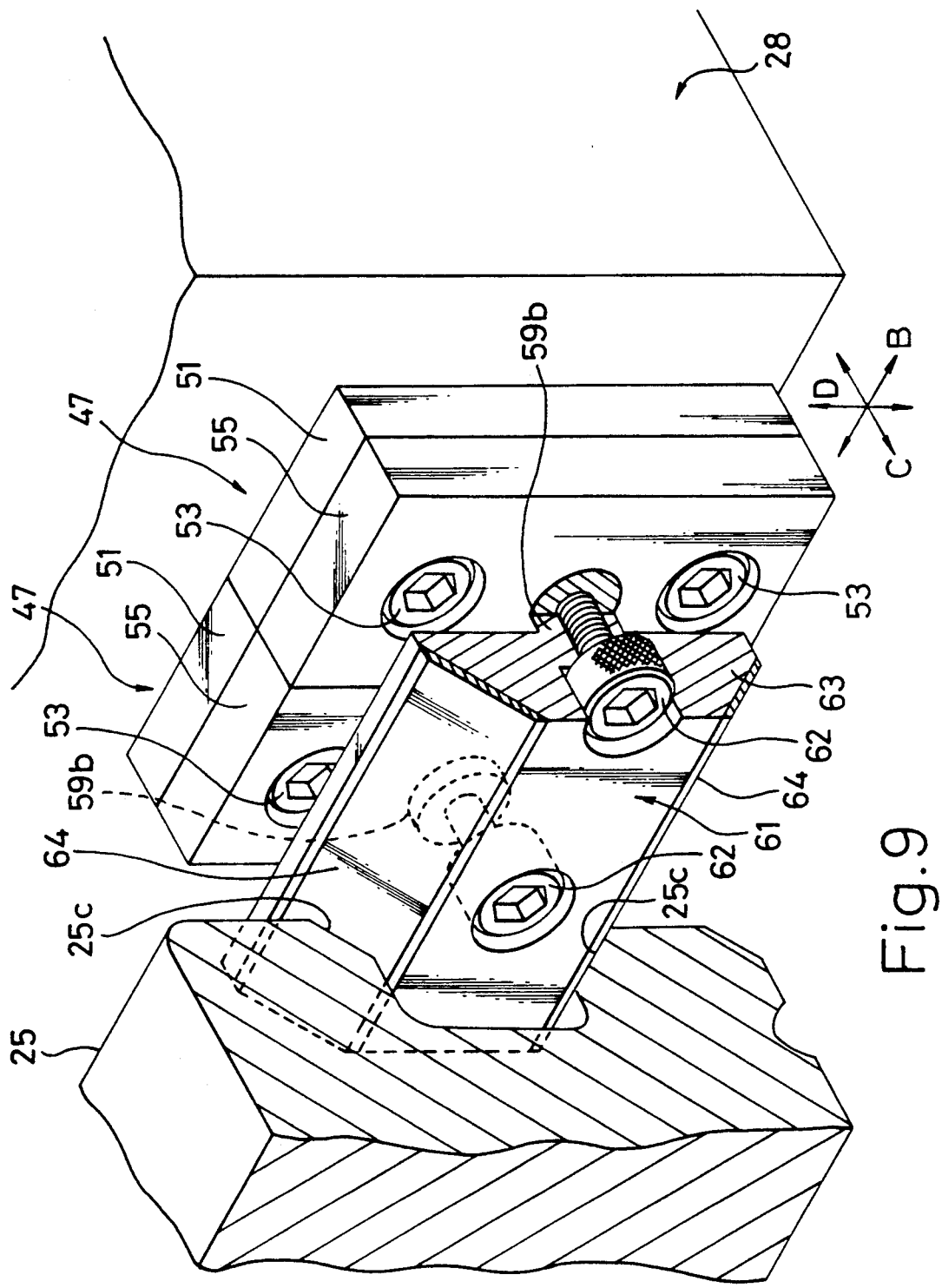
FIG. 9 is a perspective view including a partial cross-sectional view of the vibration isolation apparatus indicated in FIG. 8.

Sliding member 61 is fastened to the end of piston rod 59 by bolt (with hexagon socket) 62. Sliding member 61 is attached to the end of output rod 59b of piston rod 59, and is comprised of approximately rectangular plateform friction plate 63, in which tapered surfaces 63a are formed on the upper and lower edges, and friction pads 64 affixed to tapered surfaces 63a that make sliding contact with track surfaces 25c of track rail 25. Friction pads 64 are comprised of, for example, a material having a low coefficient of friction such as PTFE, and make sliding contact with track surfaces 25c. Furthermore, as is clear from FIG. 9, one sliding member 61 each is not provided for each vibration isolation apparatus 47, but rather a single, comparatively long sliding member 61 is shared between two vibration isolation apparatuses 47. However, this is not limited to this constitution, but may also be in the form of a constitution wherein the total length of sliding member 61 (the length in the axial direction of rack rail 25) is made to be roughly half the size indicated in the drawing, with one sliding member each then being provided exclusively for each vibration isolation apparatus 47.

On the other hand, a force application device in the form of a spring member, in this case coil spring 65, is provided at the back end of piston rod 59 to apply force in the direction in which said piston rod protrudes, or in other words, towards the left in FIG. 8.

Figure 10:
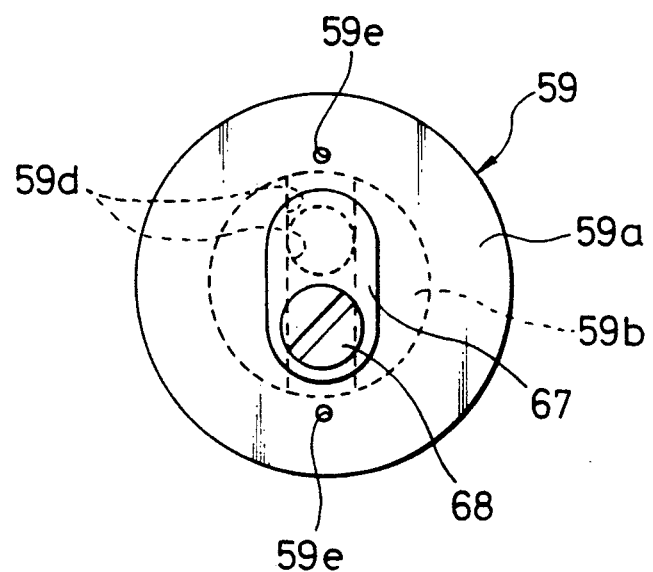
FIG. 10 is a perspective view in the direction of arrows I—I with respect to FIG. 8.

As is clear from FIG. 8 and FIG. 10, large diameter connecting hole 59d and small diameter connecting hole 59e are formed in the back end of piston rod 59 to mutually connect one chamber 54a of liquid sealed chamber 54 with the other chamber 54b, which are divided to the front and back of said piston rod by piston 59a of said piston rod. Furthermore, large diameter connecting hole 59d is comprised of a lateral hole portion passing through output rod 59a of piston rod 59 perpendicular to the axial direction of said rod, and a longitudinal hole portion passing through to said lateral hole portion extending in said axial direction at the front end, and opening towards the back end of piston 59a at the back end. In addition, two small diameter connecting holes 59e are formed at symmetrical locations above and below the axial center of piston rod 59, each extending along said axial center and opening at the front end and back end of piston 59a.

Valve 67, formed in the shape of a long plate, is mounted on the back end of piston rod 59 at its lower end by screw 68. Valve 67 is made of, for example, a material such as rubber, has suitable flexibility, and is able to block large diameter connecting hole 59d with its upper end. This packing 67 and screw 68 comprise a regulating device that regulates the flow of oil 57 to the front end from the back end of the piston via connecting hole 59d.

The following provides an explanation of the damping action accompanying sliding operation of the linear motion rolling guide unit having the constitution described above.

As indicated in FIG. 5, workpiece 69 is placed and locked on table 23, table 23 moves back and forth in the direction indicated by arrow B by a driving device not shown, and the required processing, such as cutting work, is performed on workpiece 69. When performing processing of workpiece 69 in this manner, complex vibrations are applied to table 23. These vibrations can be defined as being divided into components including the above-mentioned direction indicated by arrow B, as well as the directions indicated by arrows C and D perpendicular to said direction.

Vibration components in the direction of arrow B are effectively dampened by friction pads 64 provided on vibration isolation unit 28 making sliding contact with track surfaces 25c of track rail 25 by means of the force applied by coil spring 65.

On the other hand, vibration components in the directions of arrows C and D are dampened by means of the action described below.

Firstly, vibration isolation apparatuses 47 arranged to the left and right so as to be juxtaposed around track rail 25 in the direction of arrow C move in coordination to dampen vibration components in said direction. More specifically, when vibrations occur, impact force is applied to one of these vibration isolation apparatuses 47 to the left and right corresponding to the direction of those vibrations. As a result, the friction plate 63 equipped on that vibration isolation apparatus is pressed by said impact force. Accordingly, piston rod 59 directly coupled with said friction plate is pushed in to the right in FIG. 8. Consequently, oil 57 flows into chamber 54a from chamber 54b of sealed liquid chamber 54 through small diameter connecting holes 59e. Vibration energy is thus absorbed by liquid resistance caused by this inflow of oil resulting in damping of vibrations. When the direction of these vibrations is opposite to that described above, the other vibration isolation apparatus juxtaposed around track rail 25 performs damping in a similar fashion. Furthermore, when either one of these vibration isolation apparatuses juxtaposed around track rail 25 performs damping action, piston rod 59 of the other vibration isolation apparatus is pushed back by the resilient force of coil spring 65 with which it is equipped. Sliding member 61 comprised of friction plate 63 and friction pads 64, maintains contact with track surfaces 25c of track rail 25. During the time this piston rod 59 is pushed back, oil 57 instantaneously flows into chamber 54b from chamber 54a of liquid sealed chamber 54 through large diameter connecting hole 59d while valve 67 is pushed open. Therefore, sliding member 61 is able to follow the surface of track surfaces 25c.

Next, damping action for vibration components in the direction of arrow D are essentially the same as the damping action in the direction of arrow C described above. More specifically, when vibrations occur in the direction of arrow D, these vibration components are converted to vibration components in the direction of arrow C by the wedging action produced by friction pads 64 of sliding member 61 and track surfaces 25c, thus resulting in damping similar to that described above.

Furthermore, although an explanation has been given for the embodiment described above regarding damping function with respect to vibration isolation unit 28 that is not equipped with rolling elements in the form of rollers 34, damping function can also be realized by using a constitution similar to that described above for a slider in the form of sliding unit 27 equipped with rollers 34 indicated in FIGS. 4 through 6.

Figure 1:
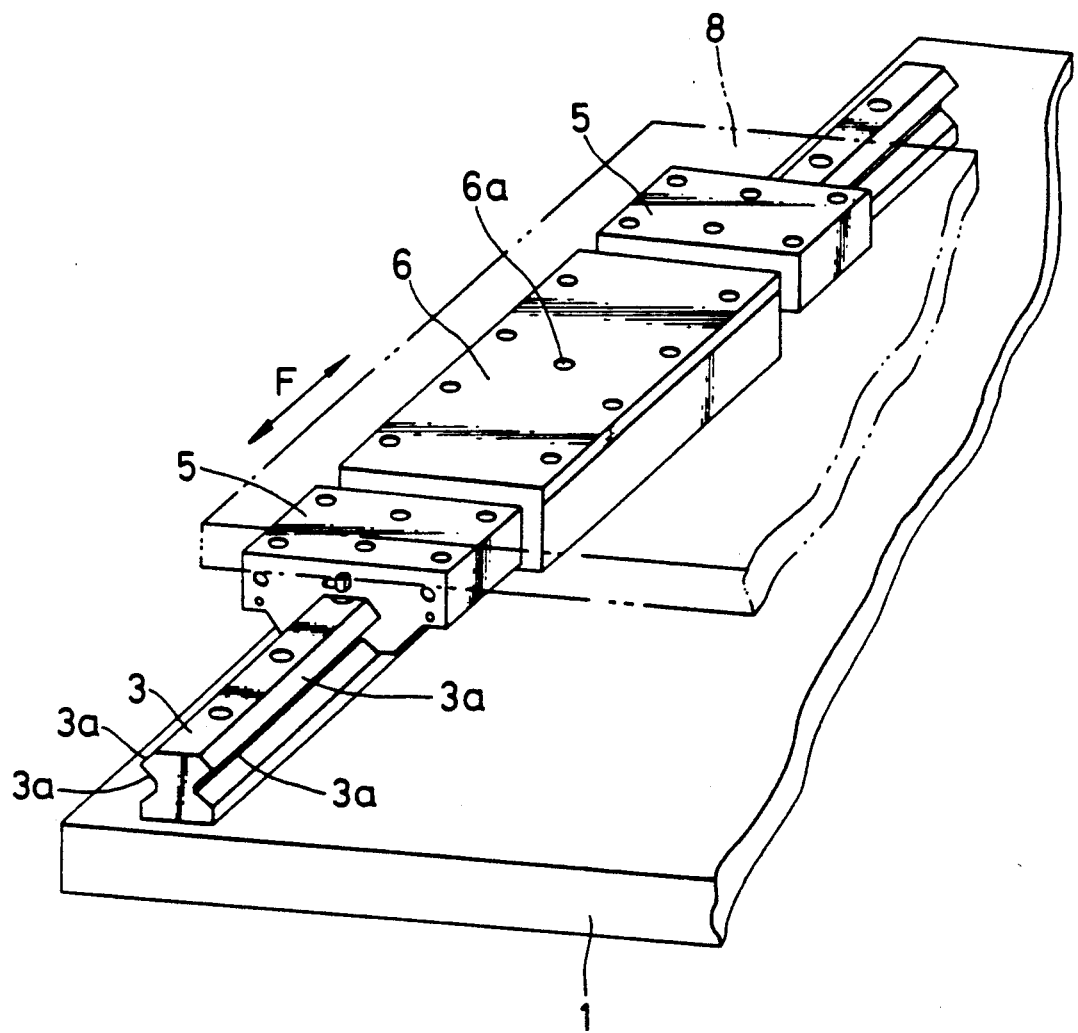
FIG. 1 is a perspective view of the linear motion rolling guide unit of the prior art mounted on the bed of a machine tool.
Figure 2:
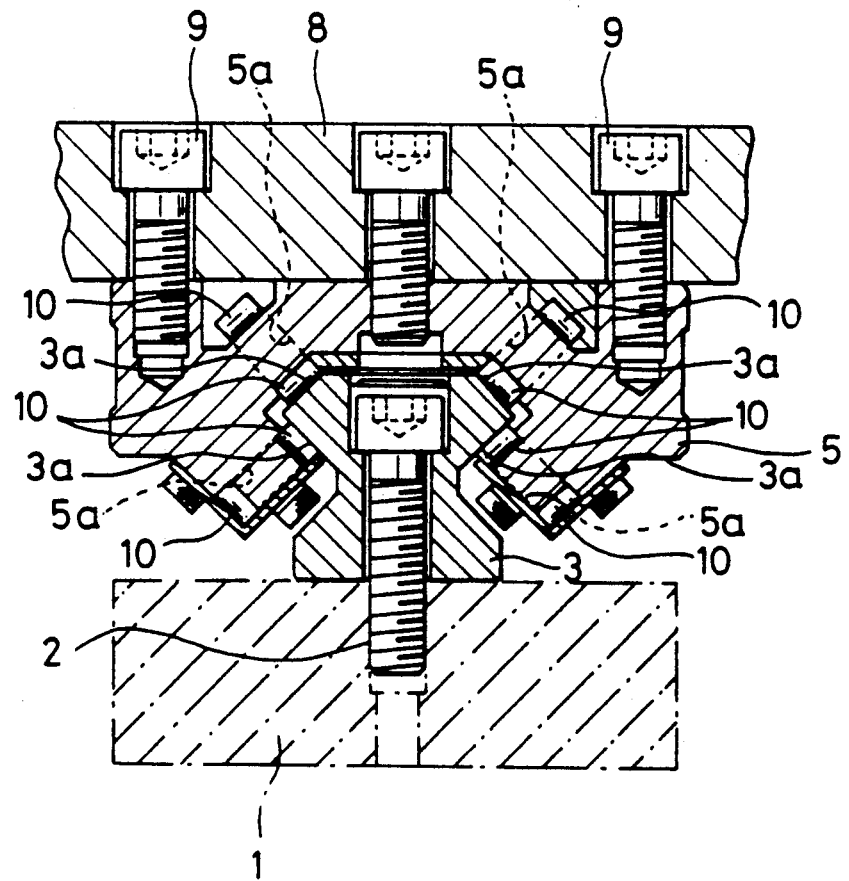
FIG. 2 is a vertical cross-sectional view of the track rail and sliding unit equipped on the linear motion rolling guide unit indicated in FIG. 1, and the table and bed located above and beneath said track rail and sliding units.
Figure 3:
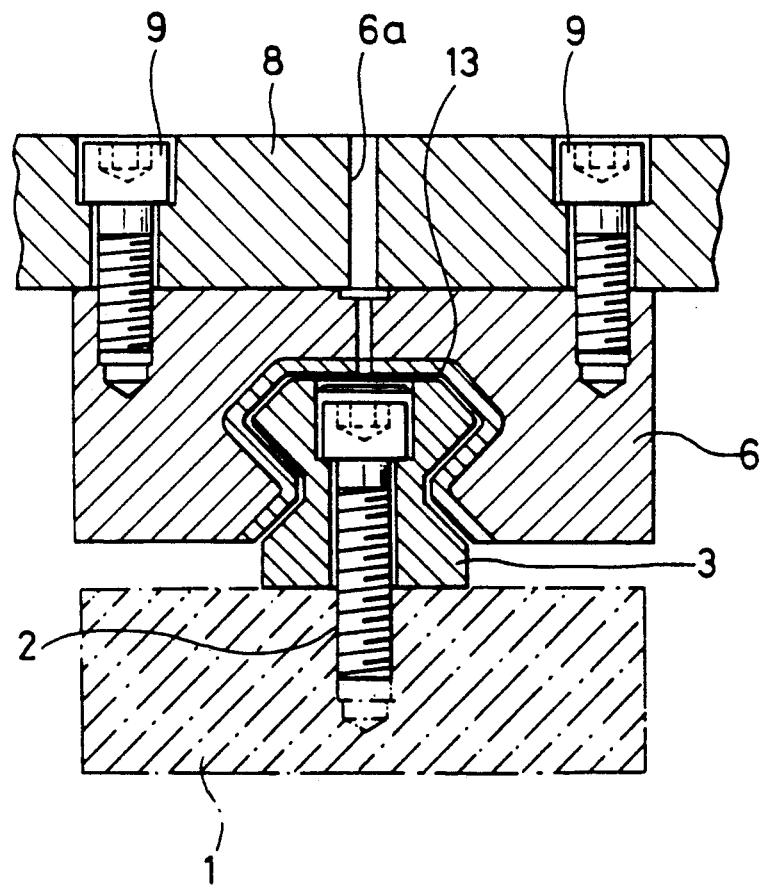
FIG. 3 is a vertical cross-sectional view of the track rail and vibration isolation unit equipped on the linear motion rolling guide unit indicated in FIG. 1, and the table and bed located above and beneath said track rail and vibration isolation unit.

In addition, even if the form of track rail 25 is like that indicated in FIG. 2, a sliding unit can be used having a form which is juxtaposed around the left and right convex portions.

In addition, although rollers 34 circulate within sliding unit 27 accompanying movement of said sliding unit in the embodiment described above, it is only natural that other constitutions may also be applied. Moreover, although rolling elements in the form of rollers are used in the present embodiment, a constitution may also be adopted wherein spherical rolling elements in the form of balls are used.

According to the present invention as described above, since a liquid providing damping action is contained in a liquid sealed chamber, the present invention offers the advantage of not requiring maintenance in the form of having to replenish said liquid. In addition, the present invention also offers the advantage of effectively suppressing vibrations in the direction of movement of the sliders, as well as vibrations applied in directions perpendicular to said direction of movement.

Moreover, the present invention also offers the additional advantage of allowing damping characteristics to be altered as desired by suitably setting the viscosity of the above-mentioned liquid, the diameter of the small diameter connecting holes for generation of liquid resistance formed in the piston rod, or the spring constant of the spring member provided as a force application device for applying force to the piston rod.

What is claimed is:

1. A linear motion rolling unit comprising: a damper device comprising of a plurality of damper apparatuses provided on a slider so as to be juxtaposed about a track rail; said apparatuses each comprising a liquid sealed chamber formed in said slider; liquid filled into said liquid sealed chamber; a piston rod provided so as to slide freely in a direction substantially perpendicular with respect to an axial direction of said liquid sealed chamber, and performing reciprocating motion with respect to said liquid sealed chamber; a sliding contact member coupled to an end of said piston rod and making sliding contact with a track surface; a force application device for applying a force in the direction of reciprocation of said piston rod; and connecting holes formed in at least a piston portion of said piston rod so as to allow fluid communication between first and second portions of said liquid sealed chamber which are separated by said piston portion.

2. The linear motion rolling guide unit of claim 1 wherein said force application device is comprised of a spring member.

3. The linear motion rolling unit of claim 1, wherein said connecting holes are of first and second types, said first type connecting hole being of larger diameter than said second type connecting hole.

4. The linear motion rolling unit of claim 3, further including a regulating device for regulating flow of said liquid through said first type connecting hole.

5. The linear motion rolling unit of claim 3, further including a regulating device for regulating the flow of said fluid between said first and second portions via said first type connecting hole.

6. A damper apparatus comprising: a liquid sealed chamber; a liquid filled into said liquid sealed chamber; a piston rod reciprocating provided within said liquid sealed chamber so as to slide freely in a prescribed direction; a sliding contact member coupled to an end of said piston rod and making sliding contact with a stationary surface; a force application device that applied force in the reciprocating direction of said piston rod; and connecting holes formed in at least a piston portion of said piston rod so as to connect portions of said liquid sealed chamber which are divided by said piston portion.

7. The damper apparatus of claim 6, wherein said connecting holes are of first and second types, said first type connecting hole being of larger diameter than said second type connecting holes.

8. The damper apparatus of claim 7, further including a regulating device for regulating flow of said liquid through said first type connecting hole.

9. The damper apparatus of claim 7, further including a regulating device for regulating the flow of said fluid between said connected portions of said chamber, via said first type connecting hole.

* * * * *